United States Patent [19]
Bruno et al.

[11] Patent Number: 5,894,475
[45] Date of Patent: Apr. 13, 1999

[54] SWITCHED VOICE AND DATA ATM NETWORK WITH BILLING SYSTEM

[75] Inventors: Richard J. Bruno, Belle Mead; Thomas S. Giuffrida, Middletown; Joseph M. Malloy, Manasquan, all of N.J.

[73] Assignee: AT&T Corp., Middletown, N.J.

[21] Appl. No.: 08/671,748

[22] Filed: Jun. 28, 1996

[51] Int. Cl.⁶ .................... H04L 12/28; H04L 12/56
[52] U.S. Cl. .................... 370/389; 370/410; 370/524
[58] Field of Search .................... 370/252, 253, 370/259, 389, 395, 396, 397, 398, 399, 400, 401, 410, 412, 413, 419, 420, 463, 465, 466, 474, 485, 486, 487, 493, 522, 524; 379/201, 114, 207; 455/2, 3.1; 705/30

[56] References Cited

U.S. PATENT DOCUMENTS

| | | | |
|---|---|---|---|
| 5,392,402 | 2/1995 | Robrock, II | 370/426 |
| 5,509,001 | 4/1996 | Tachibana et al. | 370/230 |
| 5,583,864 | 12/1996 | Lightfoot et al. | 370/396 |
| 5,623,405 | 4/1997 | Isono | 370/397 |
| 5,771,231 | 6/1998 | Watanabe | 370/399 |

*Primary Examiner*—Chau Nguyen
*Assistant Examiner*—Seema S. Rao

[57] ABSTRACT

An ATM network which collects billing data from ATM switches in a switched voice network. A full, partial or summary report is produced. The ATM switches can be anywhere in the network. The ATM network includes the ATM switches, a data collection unit and billing systems. The data collection unit collects pertinent data and outputs the data to an AT&T billing system or any other desired billing system. Because ATM systems use cells for carrying information, the system is faster and more efficient than TDM systems. In addition, the output of the data collection system is table driven and can be defined to match the input needs of TDM billing systems without increased effort or expense.

14 Claims, 2 Drawing Sheets

SWITCHED VOICE AND DATA ATM NETWORK WITH BILLING SYSTEM

The present invention is directed to a switched voice ATM network (both switched virtual circuits SVCs and permanent virtual circuits PVCs) to facilitate generating a bill, and more particularly, to collecting the needed billing data from the ATM switched network for producing a full, partial or summary call detailed billing report.

BACKGROUND OF THE INVENTION

Switched voice networks are generally of the time-division multiplex (TDM) type. TDM systems operate using switches and frames defined in time. In TDM systems, information is transmitted in frames. In-band signaling in a TDM system is inside each of the frames and is treated as a payload. A system utility takes a signaling part of the payload out of the frame and uses the information for billing purposes. This is also true for out-of-band signalling in the TDM system. A system utility recognizes the signal characteristics along with an associated payload and uses the information for billing purposes as well.

In private line exchanges customers can pay a flat rate regardless of usage. Collecting data does not occur since a bill is generated on a monthly basis, for example, and is the same every month. This type of billing system is used strictly for data transfer and not voice systems such as telephone or facsimile systems.

In telephone systems, for example, information for billing purposes is extracted by employing in-band signaling inside frames or out-of-band signaling. As noted above, the TDM system handles the in-band signaling as part of the payload or the out-of-band signalling and the associated payload. A system utility continuously extracts the signaling (dialing) part of the payload (and at the end of the day (midnight) produces an Automatic Message Accounting (AMA) record for calls spanning multiple days). That is, all network signalling is collected and sent to an appropriate billing system in the form of an AMA record. AMA is a standard billing format that directs what information is needed, where it is to go and or what to record for billing purposes. This precludes others such as hackers from accessing the information. All the billing pieces, such as time, length of call, party doing the calling, party being billed, billing company, type of service, etc., are collected and used to generate a bill. Because TDM systems operate on a time basis, billing occurs, along with other functions, at a predetermined time.

Asynchronous transfer mode (ATM) systems for transferring information are becoming more popular. Information in an ATM system is transmitted in cells rather than in frames as in a TDM system. Thus, ATM systems are flexible in terms of not having constraints as to the type of service being carried (voice, data, video, etc.).

There are no current standards on how to collect billing data from an ATM system. Standards exist only with respect to what data should be included in the AMA system. The current state of ATM technology has standards bodies working to study and approve standards in the areas of signaling, cell transfer, and accounting record format. However, using ATM in a switched voice and data network has not been achieved. Particularly, extracting billing (or other information) from a switched voice or data network using ATM has not been accomplished.

SUMMARY OF THE INVENTION

The present invention provides a system for collecting data from an ATM network. The ATM network extracts the same information as that extracted from a TDM network. Billing information collected in an ATM network is then input into any billing system for generating a customer bill without overhauling the present TDM network billing system. A full, partial or summary billing report can be generated.

These and other objects are obtained by providing a system for collecting billing data from an ATM network which includes a terminal adapter, an ATM switch, a data collection unit and a billing system. The data collection unit includes a call table for collecting call detail variables, a recorded information collection interface unit (RICIFU) for collecting copies of all cells that pass through the ATM switched network, a recorded information collection bus (RICB) for receiving data from the RICIFU and directing the data to a next object, a payload remover and/or counter coupled to the call table, the RICIFU and the RICB, a call register setup (CRS) which updates the call table, and a billing interface unit (BIFU) which receives the updated call table data and formats all call information into a desired billing format as billing information and outputs the billing information to the billing system.

The call register setup includes a unit for receiving information from a common channel signaling network, a unit for creating an initial call table entry for the call, a unit for updating the call table entry based on an in-band signaling and information from the common channel signaling system information, a unit for passing a call table entry or an automatic accounting data to the BIFU, and a unit for clearing the call table entry for a call after receiving a call tear down command from the in-band signaling. The payload remover includes a unit for removing the payload from the cell and a unit for incrementing the cell count in the call table entry for the call.

Additionally, the present invention provides a method for collecting billing information in an ATM network. The method includes initializing a call, collecting data in a call table, converting TDM protocol to ATM protocol, stripping the cell of its payload, determining if a call is completed, reformatting data for distribution to a billing system and readying the system for another call.

Initializing the call can include dialing a long distance number, placing a call using a common channel signaling system and passing the information from the common channel signaling system to all switches in the system. (collecting data in a call table includes collecting all copies of all cells passing through the ATM network, isolating in-band signals, and posting the in-band signals in a call table. Further, after the cell is stripped of its payload a cell count in the call table can be incremented.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
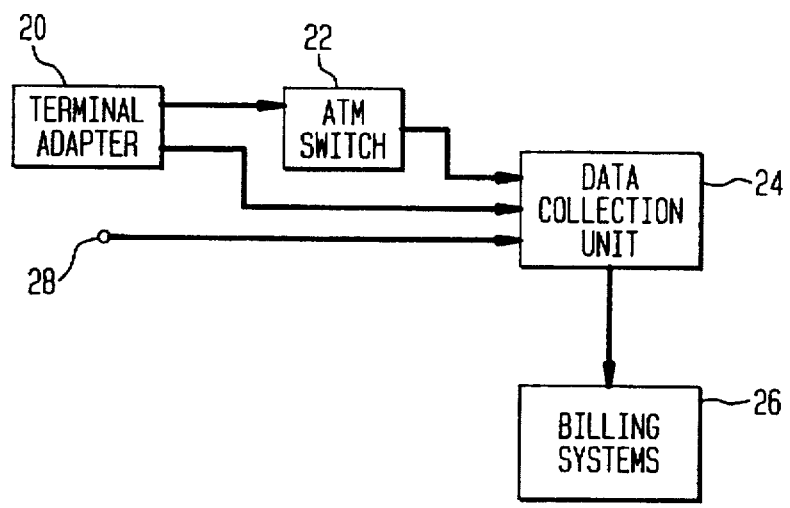
FIG. 1 is a block diagram of a billing system for an ATM network.

FIG. 1 is a block diagram according to the present invention. FIG. 1 shows a terminal adapter 20, an ATM switch 22, a data collection unit 24 and a billing system(s) 26. For simplicity, only one ATM switch 22 is shown in the drawing. However, many ATM switches 22 are employed. The ATM switches 22 can be anywhere in the network. An interconnect network such as a CCS7 (common channel system 7-AT&T's version of a signaling network based on the CCS7 standard) Network Interconnect 28 is used.

The terminal adapter 20 can be made by and obtained from a variety of vendors. The terminal adapter 20 converts TDM channels to ATM cells for use in the ATM system. An ATM cell is a packet containing 53 octets including an ATM header and payload. The first five (5) bytes are used to house the header information including, among other things, the cell's virtual path identifier (VPI) and virtual channel identifier (VCI), call priority, and error correction codes. The remaining 48 bytes contain user payload and in-band signaling. The payload can contain voice, data, multimedia or any other user defined payload. Each ATM switch 22 receives, switches and transfers ATM cells. The data collection unit 24 receives ATM cells from the ATM switches 22, interfaces with other parts of the system without data loss and sets up parameters for formatting billing data. The data collection unit 24 outputs data in a format compatible with an AT&T biller or whatever the ATM standard for message accounting is determined to be. It can also produce an output to any commercial billing system 26 having any billing format.

Figure 2:
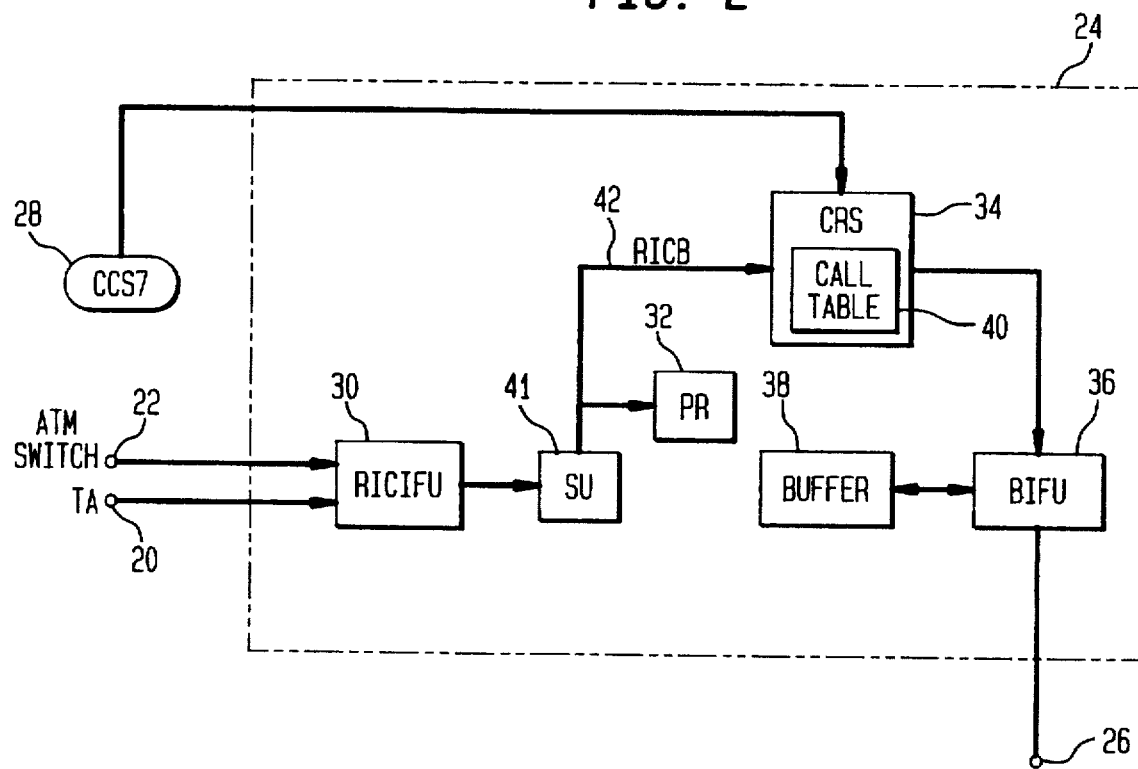
FIG. 2 is a detailed block diagram of the data collection unit in FIG. 1.

The data collection unit 24 of the present invention is now explained in more detail with respect to FIG. 2. The data collection unit includes a Recorded Information Collection and Interface Unit (RICIFU) 30, a Payload Remover (PR) 32, a Call Register Setup (CRS) 34, a Billing Interface Unit (BIFU) 36 and a buffer 38.

As shown, the data collection unit 24 has three primary inputs and one or more outputs to a billing system 26. The inputs include signaling information from the CCS7 network 28 by way of, for example, a network control point (NCP), cell traffic from the ATM switch 22 and system parameters that are manually inputted.

The signaling information is used to populate and update specific call information entries in a call table 40. It also is used to collect other data based on the data collection unit's 24 parameters. This can include, but is not limited to, the answer time, calling phone number, called phone number, billing phone number, length of call, etc. The call table 40 also has an elapsed time call register (not shown). Call attempts will also be recorded.

The cell traffic allows the collection of cell counts in each direction during the call. It can also be used to collect in-band, robbed bit signaling information.

The system parameter data is set by a system administrator to tell the system what type of data is to be collected, the output format and the system name address of the target for the output. The outputs from the data collection unit 24 include data in record format compatible with current AT&T billing systems, data in record format compatible with ATM AMA standards, or data in record format compatible with any other commercial billing system.

An interface (not shown) to the data collection unit 24 includes setting and updating all system parameters, monitoring system performance and reviewing status logs.

The RICIFU 30 receives information from the terminal adapter 20 and the ATM switches 22 and collects copies of all cells that pass through the ATM network. In accordance with data collection parameters that have been set, the RICIFU 30 passes the cells by way of a Recorded Information Collection Bus (RICB) 42 to a system utility 41 that isolates the in-band signals. The parameters can be set, for example, for D4 in-band signaling. The system utility posts the in-band signaling information in the call table 40 for the VPI (not shown) or the VCI (not shown) entry. The VPI and VCI are identifiers that identify and route the ATM cells through the network. They are commonly understood to be virtual connections between two end point switches. The format of VPI and VCI is standardized for ATM and is not described here. The system utility then passes the cells to the PR 32. The PR 32 is the data collection task that removes the cells payload and increments the cell count in the call table 40 entry for the call (VPI/VCI).

The RICB 42 is connected to receive data from the RICIFU 30 and is the data collection unit's 24 queue manager. That is, it receives data from one event and directs the data to a next event. If the receiving event is too busy to handle the data, the RICB 42 will queue the data until the receiving task is ready for the data. The RICB 42 protects all data transiting the system.

The PR 32 is coupled to the call table 40, the RICIFU 30 and the RICB 42. The use of the PR 32 is a key difference between TDM and ATM. In an ATM network, cells are billable items not just an indication of the length of the call as in a TDM system. If the cell requires further processing based on system parameters and/or the type of cell, the cell's header is sent to the CRS 34 via the RICB 42. The payload is not retained nor is it examined by the system.

The CRS 34 is a data collection unit that receives inputs from the CCS7 Network 28 and the PR 32. The CRS 34 is connected to the PR 32 and the call table 40. The CRS 34 creates an initial call table entry, updates the call table entry based on the in-band signaling and CCS7 information, and passes the needed call table entry or AMA data to the BIFU 36 for formatting and distribution. The CRS 34 will clear the call table entry for the call after it has received a call tear down command from the in-band signaling.

The BIFU 36 receives information from the CRS 34. The BIFU 36 is a data collection unit that formats all call information into the proper billing format and passes the billing information to the billing system(s) 26. Because ATM cells travel at extremely fast rates and the collection of data takes time and hardware, a buffer 38 is connected to the BIFU 36. The buffer 38 stores formatted call data and outputs the data at a slower rate at an appropriate time. The billing system(s) 26 can include ATM billing systems or commercial billing systems.

Figure 3:
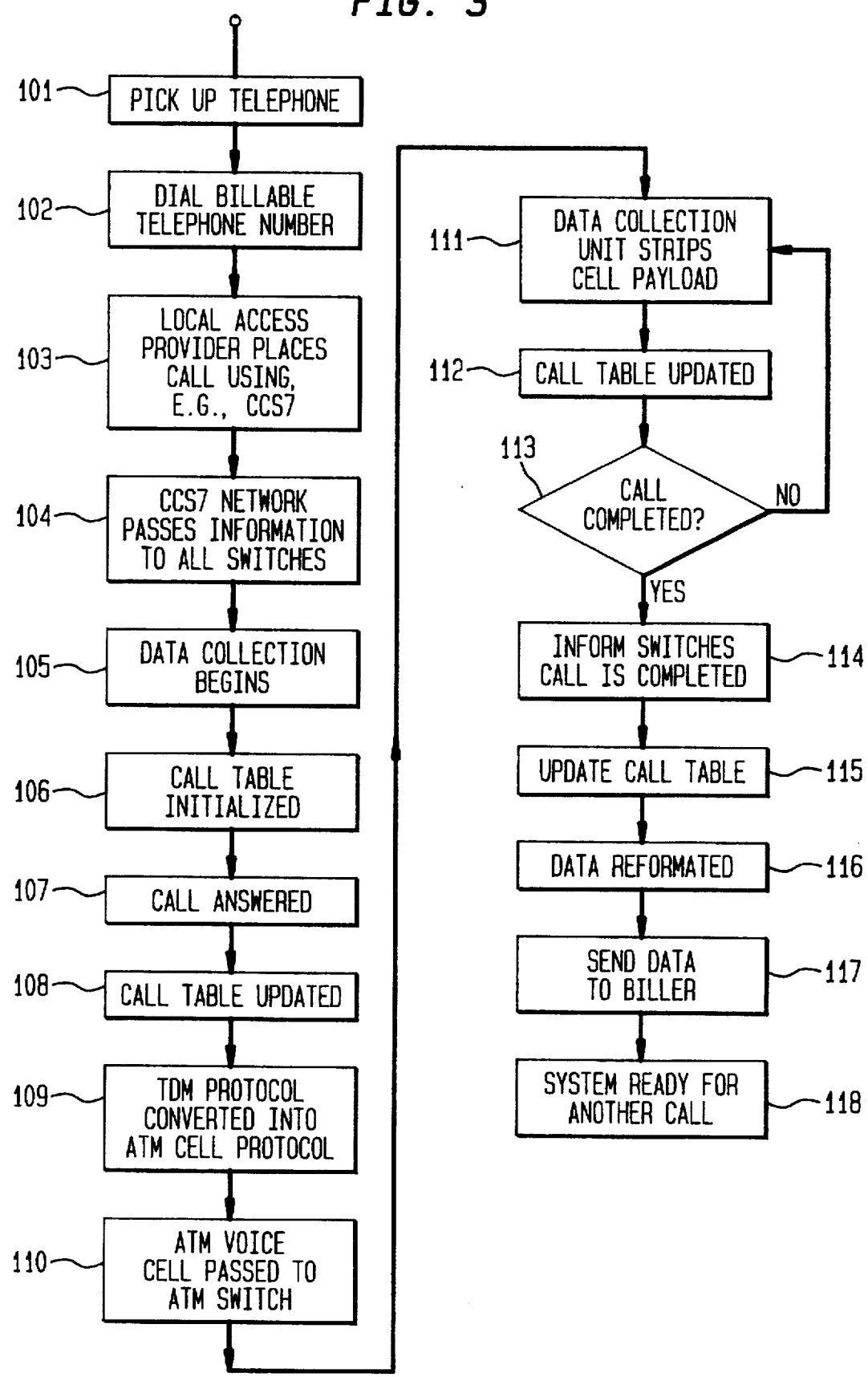
FIG. 3 is a flow chart explaining the operation of the present invention.

The operation of the present invention will now be explained with respect to the flow chart in FIG. 3. First, in step 101 a customer picks up a telephone and places, for example, a long distance call in step 102. The local access provider uses, for example, the CCS7 Network Interconnect to pass the call off to AT&T, or other provider, to begin the call in step 103. AT&T or other provider continues to use the CCS7 network to setup the long haul portion of the circuit for the call. The CCS7 network 28 talks to all the switches in the circuit to make sure the call can take place. This is referred to as the Call Setup. The CCS7 network 28 passes, in step 104, all the necessary information about the call to all of the switches in the circuit and data collection begins in step 105. The necessary information includes the calling number, called number, circuit ID, VPI/VCI, etc. The data collection process initializes the call table 40 in step 106 to collect the call information such as the start time of the call, the date of the call, the type of call, the calling number, the called number, VPI/VCI, the originating switch, etc. Once the CCS7 network 28 completes the call setup the destination telephone rings on the far end and the called party picks up the telephone in step 107. The off hook status causes the CCS7 network 28 to inform the switches in the circuit that the far end has answered the call.

The data collection unit 24 then updates the call table 40 with a call answered time in step 108. At that time, voice/data/facsimile traffic can begin to pass over the system. The terminal adapter 20 converts the TDM protocol into ATM cell protocol in step 109 and passes, in step 110, the voice data/facsimile cell to the ATM switch 22. The ATM switch 22 converts the incoming VPI/VCI from the terminal adapter 20 to the CCS7 network 28 negotiated VPI/VCI for the call. The ATM cells are passed through to the data collection unit 24. The data collection unit 24 strips the cells payload in step 111 and updates the call table 40 for the VPI/VCI just received in step 112. The terminal adapter 20 continues to convert the TDM protocol to ATM protocol and output the ATM protocol to the ATM switch 22 which continues to output the data to the data collection unit 24 until the call is completed.

Step 113 determines whether the call is completed. When the call is not completed the system returns to step 111 and continues to strip the cell payload. When the call is completed, e.g., one of the telephones involved in the call hangs up, and in step 114 the CCS7 network 28 informs the switches in the circuit that the call is completed. The data collection process updates the call table 40 in step 115 for the VPI/VCI with the call completion time, passes the call table entry for the call to the BIFU 36 for reformatting (step 116) and distributing (step 117) to the appropriate billing system(s) 26. In-band signaling requests all the switches in the system to tear down the call. That is, both the TDM and ATM system utilities send signals to the switches to terminate the call. The billing information is then formatted and passed on to the proper billing system(s) 26. The buffers 38 are then cleared of all information and the network is ready to handle a new call (step 118).

The ATM system of the present invention captures cell header and routing data as well as call setup and breakdown data. ATM switches 22 can be placed anywhere in the network. Data paths are merged to provide tracking of all call activity. A full, partial or summary call detailed report is generated based on the type of data collected in the data collection unit 24. The CRS 34 passes billing data to the BIFU 36. As noted above, the BIFU 36 converts call data to an appropriate billing system format. For example, the BIFU 36 is connected to a current 4ESS interface buffer (not shown) and the digitized signals are sent to a 3B20D complex for processing and outputting to a call detailed recording platform (CDRP) which is not shown.

As noted above, standards do not currently exist regarding the kind or type of data collection in ATM networks. Standards only exist regarding what data should be included in the AMA. However, the present invention can be simply modified to conform to whatever standards are implemented through a system parameter list. In addition, the present invention can be used in conjunction with present TDM systems without drastically modifying the existing systems.

The above-mentioned features and advantages are considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

We claim:

1. A system for collecting call information for a call from an asynchronous transfer mode (ATM) network, comprising:

a call table having a call entry for containing call information for a call;

a payload remover receiving ATM cells associated with the call, capturing ATM cell header data, and updating a cell count in the call entry in the call table, the cell count being associated with the call information for the call; and a call register setup unit receiving out-of-band signaling information from an out-of-band signaling network and storing the out-of-band signaling information in the call entry in the call table, the out-of-band signaling information being associated with the call information for the call.

2. The system of claim 1, further including a system utility receiving ATM cells associated with the call, isolating in-band signals from the ATM cells, posting the in-band signals in the call entry in the call table, and passing the ATM cells to the payload remover, the in-band signals being associated with the call information for the call.

3. The system of claim 2, further including a billing interface unit receiving the call information for the call from the call register setup unit and formatting the call information into a billing format.

4. The system of claim 3, wherein the billing interface unit formats the call information into a billing format upon termination of the call.

5. The system of claim 4, wherein the out-of-band signaling information includes at least one of an answer time, a calling phone number, a called phone number, a billing phone number and a call length.

6. The system of claim 5, wherein the call register setup unit generates the call entry in the call table when the call is initialized and clears the call entry when the call terminates.

7. The system of claim 6, wherein the cell header data includes at least one of a virtual path identifier, a virtual circuit identifier, a call priority and an error correction code.

8. The system of claim 7, wherein the call register setup unit receives cell header data from the payload remover and stores the cell header data in the call entry in the call table.

9. The system of claim 8, wherein the call entry for a call is identified by one of a virtual path identifier and a virtual circuit identifier.

10. A method for collecting call information in an ATM system, the method comprising the steps of:

a) creating a call table entry for a call in a call table for collecting call information;

b) obtaining cell header data from an ATM cell, the ATM cell being associated with the call information for the call;

c) incrementing a cell count in the call table entry for the call;

d) receiving out-of-band signaling information from an out-of-band signaling network, the out-of-band signaling data being associated with the call information for the call; and e) updating the call table entry for the call in the call table based on the cell header data and the out-of-band signaling information.

11. A method according to claim 10, further including the steps of:

e) isolating in-band signals from the ATM cell; and f) associating the in-band signals with the cell header data and the signaling information for the cell in the call table entry.

12. A method according to claim 11, wherein the step of associating the in-band signals includes the step of storing the in-band signals in the call table entry for the call associated with at least one of a virtual path identifier and a virtual circuit identifier for the call.

13. A method according to claim 10, further including the steps of:

g) determining whether the call is terminated;

h) reformatting the call table entry for distribution to a billing system when the call terminates; and i) clearing the call table entry for the call.

14. A method according to claim 10, wherein the step of creating the call table entry includes the steps of:

dialing a telephone number for the call;

placing the call using the out-of-band signaling network;

passing information from the out-of-band signaling network to switches in the ATM system; and creating the call table entry based on the information from the out-of-band signaling network.

* * * * *